United States Patent
Sholl

(10) Patent No.: US 7,484,178 B2
(45) Date of Patent: Jan. 27, 2009

(54) METHOD AND APPARATUS FOR SELF VALIDATING URL LINKS

(75) Inventor: Jason Ashley Sholl, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 10/929,752

(22) Filed: Aug. 30, 2004

(65) Prior Publication Data

US 2006/0048049 A1 Mar. 2, 2006

(51) Int. Cl.
*G06F 3/00* (2006.01)
*G06F 17/00* (2006.01)

(52) U.S. Cl. .................. 715/760; 715/205; 715/207

(58) Field of Classification Search .............. 715/501.1, 715/513, 760
See application file for complete search history.

(56) References Cited

U.S. PATENT DOCUMENTS

| | | | | |
|---|---|---|---|---|
| 5,870,546 | A | 2/1999 | Kirsch | 395/200.33 |
| 5,870,559 | A * | 2/1999 | Leshem et al. | 709/224 |
| 6,021,435 | A * | 2/2000 | Nielsen | 709/224 |
| 6,341,310 | B1 * | 1/2002 | Leshem et al. | 709/223 |
| 6,466,966 | B1 | 10/2002 | Kirsch et al. | 709/203 |
| 6,529,939 | B1 | 3/2003 | Kraft | 709/203 |
| 6,598,083 | B1 | 7/2003 | Remer et al. | 709/229 |
| 7,136,849 | B2 * | 11/2006 | Patrick | 707/3 |
| 7,194,469 | B1 * | 3/2007 | Dowd et al. | 707/10 |
| 2003/0158953 | A1 * | 8/2003 | Lal | 709/230 |
| 2004/0254913 | A1 * | 12/2004 | Bernstein et al. | 707/2 |
| 2005/0120292 | A1 * | 6/2005 | Suzuki | 715/501.1 |

FOREIGN PATENT DOCUMENTS

CA 2354993 A1 * 2/2003

OTHER PUBLICATIONS

Lawrence et al., "Persistence of Information on the web: Analyzing citations contained in research articles", ACM Digital Library, CIKM 2000, McLean, VA, USA, pp. 235-242.
Konopnicki et al., "Information Gathering in the World Wide Web: The W3QL Query Language and the W3QS System", ACM Transactions on Database Systems, vol. 23, No. 4, Dec. 1998, pp. 369-410.
Creech, "Author-oriented link management", Computer Networks and ISDN Systems, The International Journal of Computer and Telecommunications Networking, vol. 28, Nos. 7-11, May 1996, Proceedings of the Fifth International World Wide Web Conference, Paris, France, pp. 1015-1025.

* cited by examiner

*Primary Examiner*—Tadesse Hailu
*Assistant Examiner*—Nicholas S Ulrich
(74) *Attorney, Agent, or Firm*—Duke W. Yee; Martin McKinley; Wayne P. Bailey

(57) ABSTRACT

A method, apparatus, and computer instructions for processing a set of links in a document. In response to receiving the document, the set of links in the document is displayed as being validated. The set of links are then processed to determine whether the links are valid or invalid. Whenever one of the links in the set of links is identified as being valid, the display of the link is changed to indicate that the link is valid. Whenever a link in the set of links is identified as being invalid, the display of that link is changed to indicate that this link is invalid.

4 Claims, 6 Drawing Sheets

Link ——— 600

*Link* ——— 602

LINK ——— 604

<u>Link</u> ——— 606

| Link | ——— 700

▨Link▨ ——— 702

▒Link▒ ——— 704

Link * ——— 706

METHOD AND APPARATUS FOR SELF VALIDATING URL LINKS

BACKGROUND OF THE INVENTION

1. Technical Field

The present invention relates generally to an improved data processing system, and in particular to a method and apparatus for processing data. Still more particularly, the present invention relates to a method, apparatus, and computer instructions for processing links in a document.

2. Description of Related Art

The Internet is a global network of computers and networks joined together by means of gateways that handle data transfer and the conversion of messages from a protocol of the sending network to a protocol used by the receiving network. On the Internet, any computer may communicate with any other computer with information traveling over the Internet through a variety of languages, also referred to as protocols. The set of protocols used on the Internet is called transmission control protocol/Internet Protocol (TCP/IP).

The Internet has revolutionized both communications and commerce, as well as, being a source of both information and entertainment. For many users, email is a widely used format to communicate over the Internet. Additionally, the Internet is also used for real-time voice conversations.

With respect to transferring data over the Internet, the World Wide Web environment is used. This environment is also referred to simply as "the Web". The Web is a mechanism used to access information over the Internet. In the Web environment, servers and clients effect data transaction using the hypertext transfer protocol (HTTP), a known protocol for handling the transfer of various data files, such as text files, graphic images, animation files, audio files, and video files.

On the Web, the information in various data files is formatted for presentation to a user by a standard page description language, the hypertext markup language (HTML). Documents using HTML are also referred to as Web pages. Web pages are connected to each other through links or hyperlinks. These links allow for a connection or link to other Web resources identified by a universal resource identifier (URI), such as a uniform resource locator (URL).

A browser is a program used to look at and interact with all of the information on the Web. A browser is able to display Web pages and to traverse links to other Web pages. Resources, such as Web pages, are retrieved by a browser, which is capable of submitting a request for the resource. This request typically includes an identifier, such as, for example, a URL. As used herein, a browser is an application used to navigate or view information or data in any distributed database, such as the Internet or the World Wide Web. A user may enter a domain name through a graphical user interface (GUI) for the browser to access a source of content. The domain name is automatically converted to the IP address by a domain name system (DNS), which is a service that translates the symbolic name entered by the user into an IP address by looking up the domain name in a database.

The browser includes a user interface, which is a GUI that allows the user to interface or communicate with another browser. This interface provides for selection of various functions through menus and allows for navigation. For example, a menu may allow a user to perform various functions, such as saving a file, opening a new window, displaying a history, and entering a URL.

In following links in a document, it is not uncommon for the document to have invalid links. An invalid link is a link that does not lead to a document. Instead, an error is returned and a message is displayed on the browser to the user stating that the particular page cannot be displayed. For example, with HTTP requests, and error code of 404 is returned if the document is not found on the server. In such a case, the page may no longer be present or may have been moved to another location. In selecting invalid links, the user is required to spend time waiting for a non-existent document to load onto the Web browser. In other words, when loading a non-existent link in a Web browser, the user waits while the Web browser determines that the specified link does not exist. Having to wait to find out that a page or a link no longer exists can be frustrating and time consuming.

Therefore, it would be advantageous to have an improved method, apparatus, and computer instructions for identifying valid and invalid links.

BRIEF SUMMARY OF THE INVENTION

The present invention provides a method, apparatus, and computer instructions for processing a set of links in a document. In response to receiving the document, the set of links in the document is displayed as being validated. The set of links are then processed to determine whether the links are valid or invalid. Whenever one of the links in the set of links is identified as being valid, the display of the link is changed to indicate that the link is valid. Whenever a link in the set of links is identified as being invalid, the display of that link is changed to indicate that this link is invalid.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
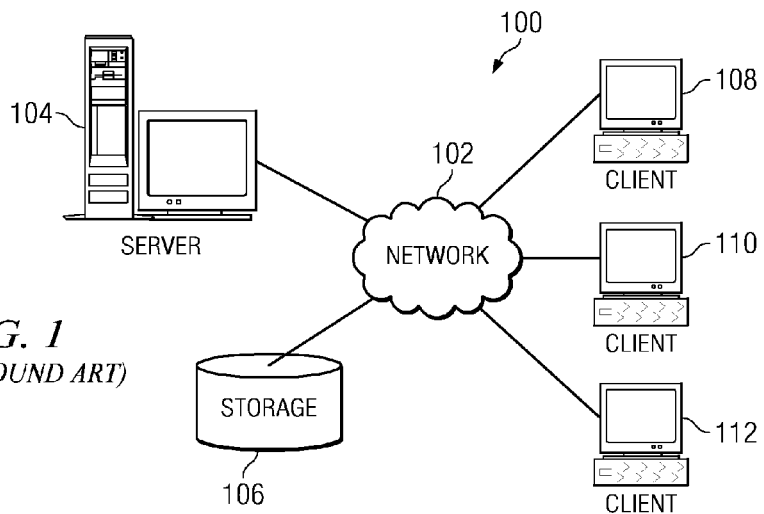
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
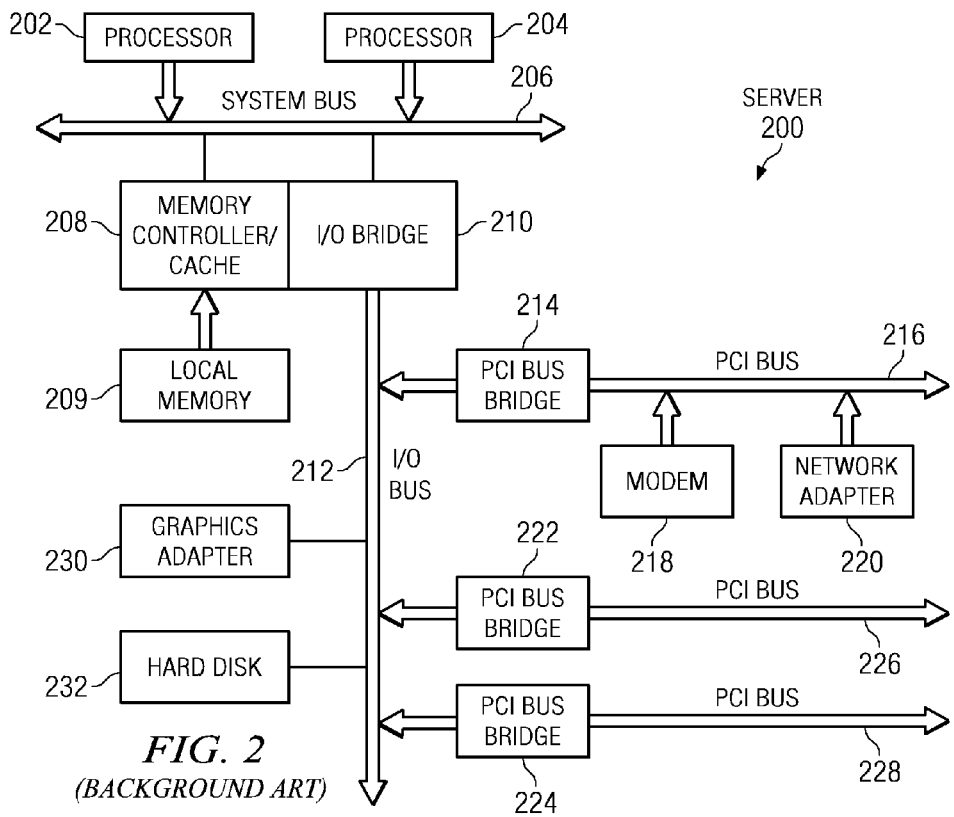
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
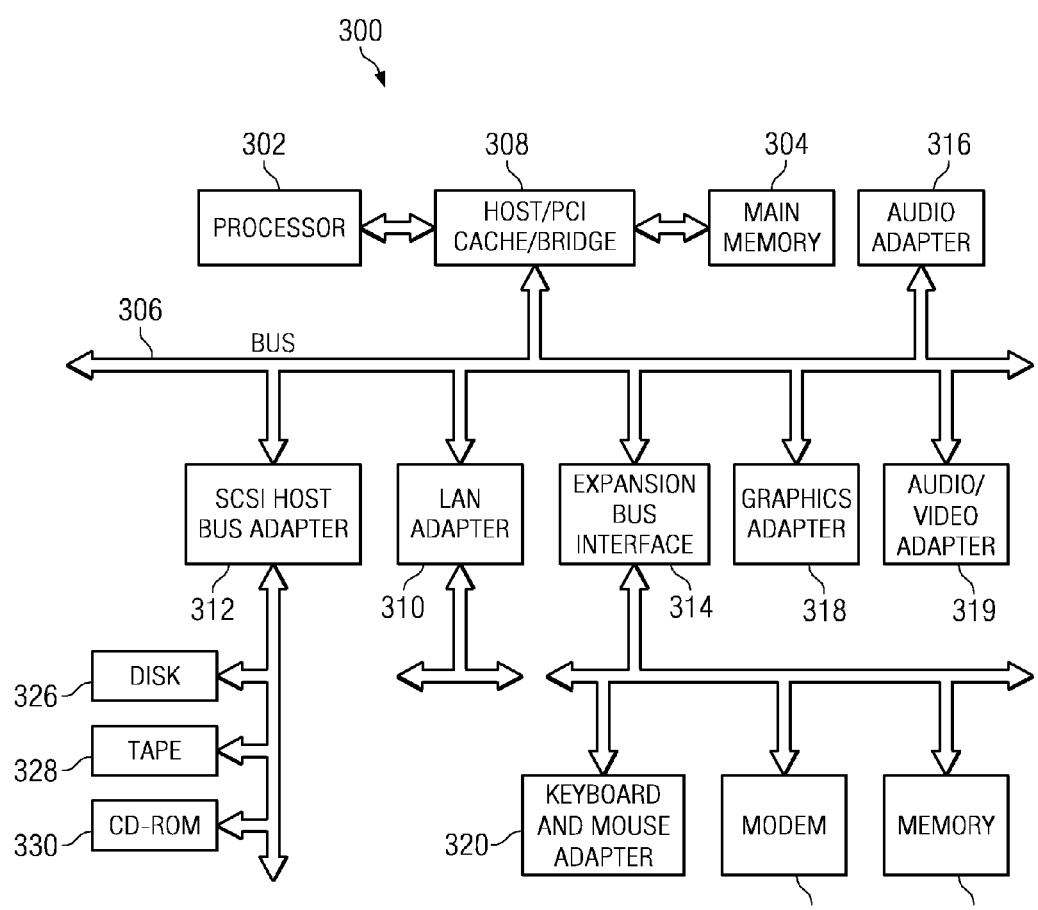
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
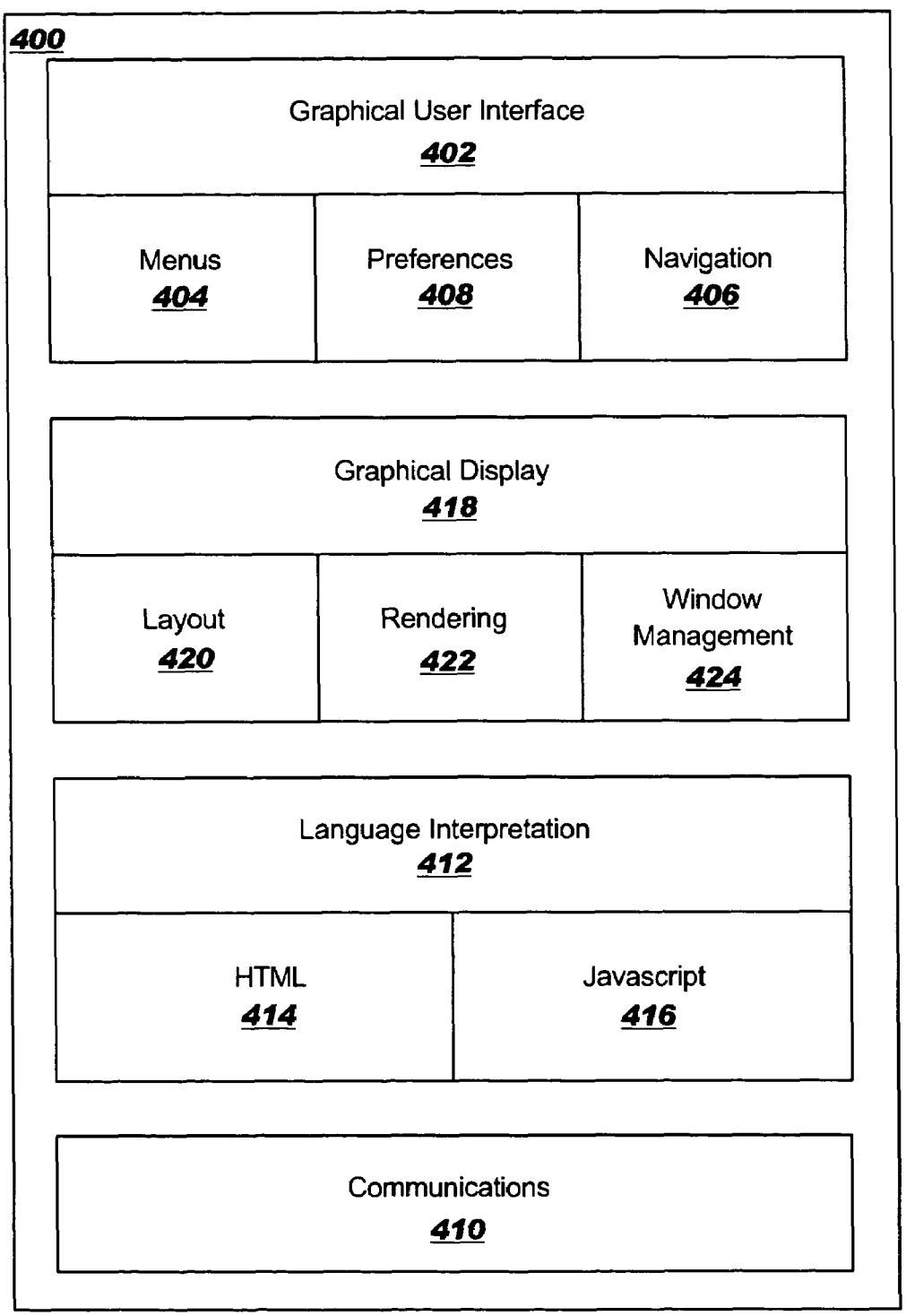
FIG. 4 is a block diagram of a browser program in accordance with a preferred embodiment of the present invention.

Turning next to FIG. 4, a block diagram of a browser program is depicted in accordance with a preferred embodiment of the present invention. A browser is an application used to navigate or view information or data in a distributed database, such as the Internet or the World Wide Web.

In this example, browser 400 includes a user interface 402, which is a graphical user interface (GUI) that allows the user to interface or communicate with browser 400. This interface provides for selection of various functions through menus 404 and allows for navigation through navigation 406. For example, menus 404 may allow a user to perform various functions, such as saving a file, opening a new window, displaying a history, and entering a URL. Navigation 406 allows for a user to navigate various pages and to select Web sites for viewing. For example, navigation 406 may allow a user to see a previous page or a subsequent page relative to the present page. Preferences such as those illustrated in FIG. 4 may be set through preferences 408.

Communications 410 is the mechanism with which browser 400 receives documents and other resources from a network such as the Internet. Further, communications 410 is used to send or upload documents and resources onto a network. In the depicted example, communication 410 uses HTTP. Other protocols may be used depending on the implementation. Documents that are received by browser 400 are processed by language interpretation 412, which includes an HTML unit 414 and a JavaScript unit 416. Language interpretation 412 will process a document for presentation on graphical display 418. In particular, HTML statements are processed by HTML unit 414 for presentation while JavaScript statements are processed by JavaScript unit 416.

Graphical display 418 includes layout unit 420, rendering unit 422, and window management 424. These units are involved in presenting Web pages to a user based on results from language interpretation 412.

Browser 400 is presented as an example of a browser program in which the present invention may be embodied. Browser 400 is not meant to imply architectural limitations to the present invention. Presently available browsers may include additional functions not shown or may omit functions shown in browser 400. A browser may be any application that is used to search for and display content on a distributed data processing system. Browser 400 may be implemented using known browser applications, such as Netscape Navigator or Microsoft Internet Explorer. Netscape Navigator is available from Netscape Communications Corporation while Microsoft Internet Explorer is available from Microsoft Corporation.

The present invention provides an improved method, apparatus, and computer instructions for processing a set of links in a document, such as a Web page. In these examples, the Web page may be made up of static and/or dynamic HTML content. In response to receiving a document, the links are displayed in a manner that indicates to the user that the links are being validated. This state is the initial state in which all of the links are displayed in these illustrated examples. Also, each link is validated using a separate thread. In this manner, multiple links may be validated in parallel.

When the validity of a link is identified, the display of this link is updated to reflect whether the link is valid or invalid. The mechanism of the present invention may display the different states of a link in different ways. For example, different colors, font types, font sizes, images, graphical indicators, background, and text may be used. Additionally, the mechanism of the present invention may check only external links. These types of links are links that point to documents or content located on different servers or domains other than the server from which the current document originated. Additionally, links external documents may be identified visually as being different from those pointing to internal documents. As a result, a clear picture of a document's or site's boundaries may be presented to a user.

The mechanism of the present invention may be implemented within a software program, such as browser 400 in FIG. 4. This illustrative embodiment does not require any changes to server processes. In particular, the mechanism of the present invention may be implemented within language interpretation 412 of browser 400. For example, this particular component within browser 400 may alter the display of links identified in received documents to indicate states, such as valid links, invalid links, and validating links. Additionally, changing the display of links to indicate or identify external links also may be shown.

The type of indication used may vary depending on the particular implementation, for example, valid links, invalid links, and validating links may have different font sizes, colors, or font types as examples of ways to distinguish or provide indications of the status of links. Further, the font size, font type, or color also may be used to identify external links, which are links pointing to documents on different servers or domains.

Figures 5, 6, 7:
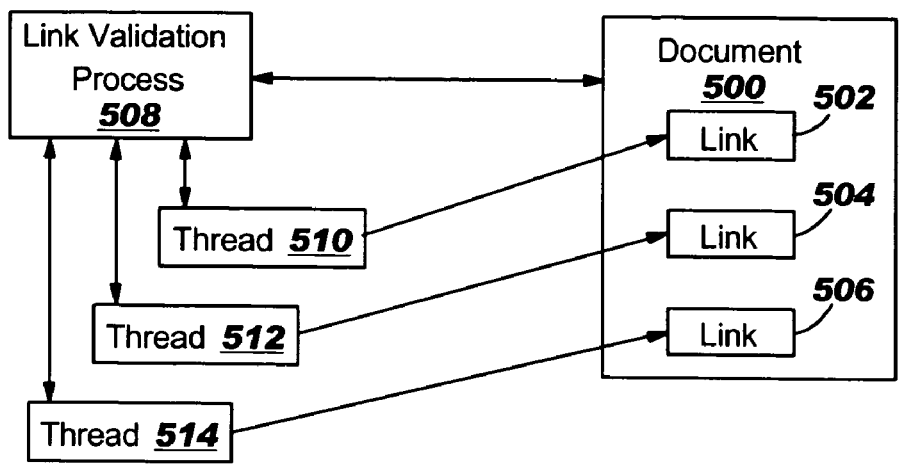
FIG. 5 is a diagram illustrating components used in validating links in accordance with a preferred embodiment of the present invention.
FIG. 6 is a diagram illustrating graphical indications for links in accordance with a preferred embodiment of the present invention.
FIG. 7 is a diagram illustrating different states for links in accordance with a preferred embodiment for the present invention.

Turning now to FIG. 5, a diagram illustrating components used in validating links is depicted in accordance with a preferred embodiment of the present invention. The process also may be implemented as a plug-in to browser 400 depending on the particular implementation. A plug-in, as used in these examples, is an auxiliary program that works with a major software package, such as a browser to enhance the capability of this software package. Typically, plug-ins are added to web browsers to enable these programs to support new types of content. In these examples, the plug-in may be use to support the validation mechanism of the present invention. As depicted, document 500 has been received in response to a request for the document from a source, such as a Web server. In this example, document 500 is an HTML document, such as a Web page. Document 500 contains links 502, 504, and 506. When document 500 is received by the browser, the browser does not know whether the links are valid or invalid. Validation process 508 identifies links 502, 504, and 506 as being present within document 500. In response to identifying these links, the links are initially displayed as being validating. Additionally, while the links are being displayed as validating, link validation process 508 spawns or initiates a separate thread to validate each of the identified links. In this illustrative example, thread 510 is used to validate link 502, thread 512 is used to validate link 504, and thread 514 is used to validate link 506. Of course, depending on the particular implementation, a single thread may validate more than one link in the document.

Each of these threads may validate a link in various ways. In these illustrative examples, a thread requests the content from the location identified by the link. If the content is returned, then the link is considered valid. If an error is returned or a timeout occurs, the link may be marked as invalid. Once the state of the link is identified by a thread, the display of that link in document 500 is changed.

In this illustrative example, validation process 508 may be implemented within language interpretation 412 in FIG. 4. Alternatively, this particular process may be implemented as part of the plug-in. These threads return those indications to validation process 508, which alters the display of the links depending on the status indicated by these threads.

Additionally, link validation process 508 also may identify links that are pointing to external documents. These links are links pointing to documents on different servers or domains than the server or domain from which document 500 was obtained. In these illustrative examples, a server may be a Web server. More than one server may run on a single data processing system, such as data processing system 200 in FIG. 2. A link to a Web server on a different Web server other than the originating document is identified as an external link even though the Web server may be on the same data processing system.

In this manner, the indications of these external links and internal links may provide a clearer picture of a boundary for a document, such as a Web page, as to the links within the document. Additionally, a clearer picture of the boundaries of a Website also may be identified in this manner.

Turning next to FIG. 6, a diagram illustrating graphical indications for links is depicted in accordance with a preferred embodiment of the present invention. The links illustrated in FIG. 6 may be generated through a process, such as link process validation 508 in FIG. 5. In this example, link 600 is a validating link, link 602 is a valid link, while 604 is an invalid link. In this particular example, link 600 is shown in a normal font, while link 602 is shown in italics form. Link 604 is shown in all caps.

These different types of displays of the links are used to indicate the validity or status of a link. Link 606 is underlined to indicate the link is an internal link and will not be validated. Of course, other types of indications or display characteristics may be used to identify the state of length. For example, a graphical indicator may be displayed in association with each link to identify the state of the link.

Turning next to FIG. 7, a diagram illustrating different states for links is depicted in accordance with a preferred embodiment for the present invention. In this illustrative example, link 700 is displayed with a background that identifies the link as a valid link. Link 702 is displayed with a background identifying the link as an invalid link. Link 704 is displayed with a background to identify the link as a validating link. Link 706 is displayed with a graphical indicator in the form of a "*" as one that is an internal document.

Figure 8:
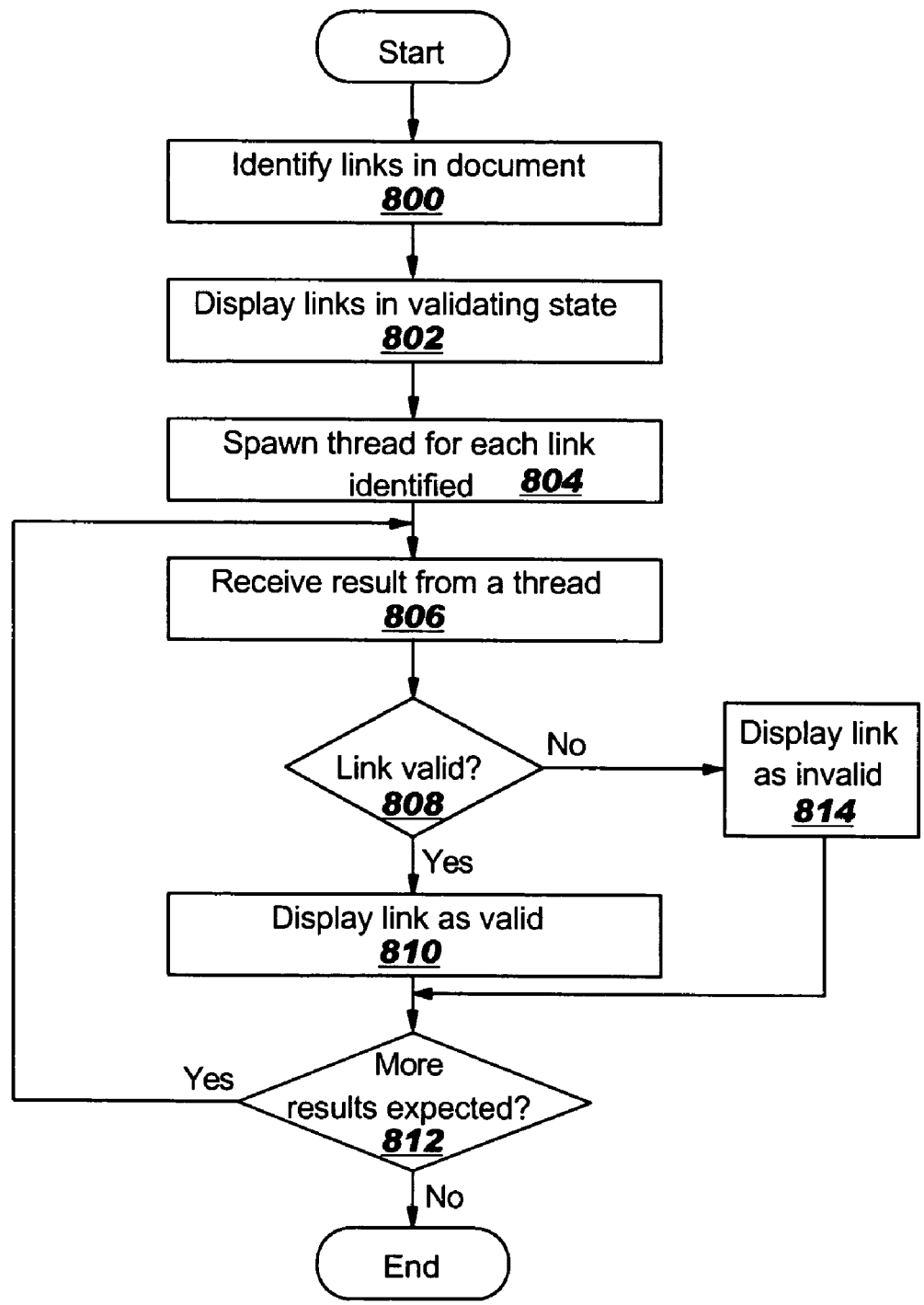
FIG. 8 is a flowchart of a process for validating links in accordance with a preferred embodiment of the present invention.

Turning now to FIG. 8, a flowchart of a process for validating links is depicted in accordance with a preferred embodiment of the present invention. The process illustrated in FIG. 8 may be implemented in a process, such as link validation process 508 in FIG. 5.

The process begins by identifying links in the document step 800. In step 800, the links identified in the document are identified as those being to external links for processing. Of course, the links identified may be all the links in the document, depending on the particular implementation. Next, all of the links are displayed in an initial validating state (step 802).

Thereafter, a thread is spawned for each link identified in the document (step 804). Thereafter, a result is received from a thread (step 808). A determination is made as to whether the link is valid (step 806). If the link is valid, then the display of the link is changed to a valid state (step 810). Thereafter, a determination is made as to whether additional results are expected from the thread (step 812). If additional results are not expected, the process terminates, otherwise, the process returns to (step 806) as described above.

With reference again to step 808, if the link is not valid, the link is displayed as being invalid (step 814) with the process then proceeding to step 812 as described above.

Figure 9:
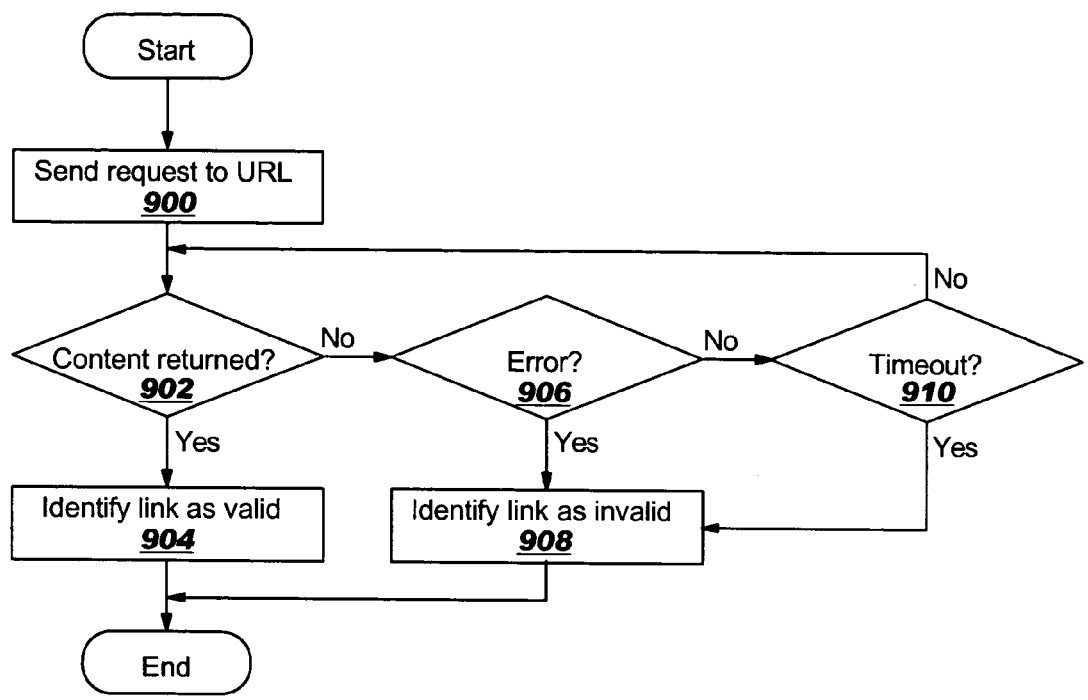
FIG. 9 is a flowchart of a process for determining the validity of the link in accordance with a preferred embodiment of the present invention.

Turning next to FIG. 9, flowchart of a process for determining the validity of the link is depicted in accordance with a preferred embodiment of the present invention. The process illustrated in FIG. 9 may be implemented with a thread, such as thread 510 in FIG. 5.

The process begins by sending a request to the URL of the link (step 900). A determination is made as to whether content is returned in response to the request (step 902). In step 902, an error code may be returned if no content is present at the location identified by the URL. For example, an error code of 404 is returned by the server if the content is not present on the server. If the content is returned, the link is identified as being valid (step 904) with the process terminating thereafter.

With reference again to (step 902), if content is not returned in response to the request, a determination is made as to whether an error code has been returned (step 910). This step may look at any error code returned by the server in response to the request. For example, if HTTP is used, an error code of 408 is returned to indicate that a timeout has occurred. If an error code has been returned, the link is identified as an invalid link (step 908) with the process terminating thereafter.

With reference again to step 906, if an error code has not been returned, a determination is made as to whether a timeout occurred (step 910). If timeout has not occurred, the process returns to step 902. Otherwise the process proceeds to step 908 as described above.

Thus, the present invention provides an improved method, apparatus, and computer instructions for validating links. The mechanism of the present invention initially displays links identified in a document as being in a validating state. Then, processes, such as threads, are initiated to determine whether the links are valid links. If a link is identified as being valid, the state of the link is changed to indicate that the link is valid. If a link is identified as being invalid, the display of the link is changed to identify the link as being invalid.

Additionally, the mechanism of the present invention also may be used to identify links that are internal or external to the particular Website from which the document has been received. In this matter, checking of links may be limited only to external links, those pointed to other Web servers or domains.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although the examples are illustrated using HTTP requests, the mechanism of the present invention may be implemented using any type of protocol. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for processing a set of links in a document, the method comprising:
  responsive to receiving the document, displaying all of the set of links;
    wherein external links are displayed as being in an initial state; and the external links are visually displayed differently from internal links in the set of links by using different character display characteristics than those used for displaying the internal links;
  validating only the external links in the set of links by (i) sending a request using a external link in the set of links; (ii) responsive to content being returned, identifying the external link as being valid, and (iii) responsive to an error occurring, identifying the external link as being invalid;
    wherein the validating step includes initiating a thread for each external link in the set of links by a link validation process of a web browser plug-in to validate all external links in the set of links;
  responsive to identifying the external link as being valid, changing the display of the external link to a valid state;
  responsive to identifying the external link as being invalid, changing the display of the external link to a invalid state; and
  the initial, valid, and invalid states associated with the external links are concurrently displayed;
    wherein the valid state is displayed using a first color, the invalid state is displayed using a second color, and the initial state is displayed using a third color; and the first, second, and third colors are different colors.

2. A data processing system for processing a set of links in a document, the data processing system comprising:
  a bus system;
  a communications unit connected to the bus system; a memory connected to the bus system, wherein the memory includes a set of instructions;
  a processing unit connected to the bus system, wherein the processing unit executes the set of instructions to:
    display all of the set of links;
      wherein external links are displayed as being in an initial state; and the external links are visually displayed differently from internal links in the set of links by using different character display characteristics than those used for displaying the internal links;
    validate only the external links in the set of links by (i) sending a request using a external link in the set of links; (ii) responsive to content being returned, identifying the external link as being valid, and (iii) responsive to an error occurring, identifying the external link as being invalid;
      wherein the validating step includes initiating a thread for each external link in the set of links by a link validation process of a web browser plug-in to validate all external links in the set of links;
    changing the display of the external link to a valid state in response to identifying the external link as being valid;
    changing the display of the external link to a invalid state in response to identifying the external link as being invalid; and
    concurrently display the initial, valid, and invalid states associated with the external links;
      wherein the valid state is displayed using a first color, the invalid state is displayed using a second color, and the initial state is displayed using a third color; and the first, second, and third colors are different colors.

3. A data processing system for processing a set of links in a document, the data processing system comprising:
  displaying means, responsive to receiving the document, for displaying all of the set of links;
    wherein external links are displayed as being in an initial state; and the external links are visually displayed differently from internal links in the set of links by using different character display characteristics than those used for displaying the internal links;
  validating means for validating only the external links in the set of links by (i) sending a request using a external link in the set of links; (ii) responsive to content being returned, identifying the external link as being valid, and (iii) responsive to an error occurring, identifying the external link as being invalid;
    wherein the validating means includes means for initiating a thread for each external link in the set of links by a link validation process of a web browser plug-in to validate all external links in the set of links; and
  displaying means for changing the display of the external link to a valid state in response to identifying the external link as being valid, changing the display of the external link to a invalid state in response to identifying the external link as being invalid, and concurrently displaying the initial, valid, and invalid states associated with the external links;
    wherein the valid state is displayed using a first color, the invalid state is displayed using a second color, and the initial state is displayed using a third color; and the first, second, and third colors are different colors.

4. A computer readable recordable-type medium encoded with a computer program product and operable in a data processing system for processing a set of links in a document, the computer program product comprising:
  first instructions for displaying all of the set of links, responsive to receiving the document;
    wherein external links are displayed as being in an initial state; and the external links are visually displayed differently from internal links in the set of links by using different character display characteristics than those used for displaying the internal links;
  second instructions for validating only the external links in the set of links by (i) sending a request using a external link in the set of links; (ii) responsive to content being returned, identifying the external link as being valid, and (iii) responsive to an error occurring, identifying the external link as being invalid;
    wherein the second instructions include initiating a thread for each external link in the set of links by a link validation process of a web browser plug-in to validate all external links in the set of links; and
  third instructions for changing the display of the external link to a valid state in response to identifying the external link as being valid, changing the display of the external link to a invalid state in response to identifying the external link as being invalid, and concurrently displaying the initial, valid, and invalid states associated with the external links;
    wherein the valid state is displayed using a first color, the invalid state is displayed using a second color, and the initial state is displayed using a third color; and the first, second, and third colors are different colors.

* * * * *